United States Patent
Osawa et al.

(10) Patent No.: US 12,457,425 B2
(45) Date of Patent: Oct. 28, 2025

(54) IMAGING APPARATUS CONFIGURED TO PERFORM TWO EXPOSURE CONTROLS

(71) Applicant: CANON KABUSHIKI KAISHA, Tokyo (JP)

(72) Inventors: Shinnosuke Osawa, Kanagawa (JP); Hideki Kadoi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 148 days.

(21) Appl. No.: 18/486,308

(22) Filed: Oct. 13, 2023

(65) Prior Publication Data

US 2024/0137657 A1 Apr. 25, 2024
US 2024/0236502 A9 Jul. 11, 2024

(30) Foreign Application Priority Data

Oct. 19, 2022 (JP) .................................. 2022-167664

(51) Int. Cl.
*H04N 23/76* (2023.01)
*H04N 23/62* (2023.01)

(52) U.S. Cl.
CPC ............. *H04N 23/76* (2023.01); *H04N 23/62* (2023.01)

(58) Field of Classification Search
CPC ........ H04N 23/71; H04N 23/72; H04N 23/76; H04N 23/62; H04N 23/667; H04N 23/82
See application file for complete search history.

(56) References Cited

U.S. PATENT DOCUMENTS

| 11,206,360 | B2 * | 12/2021 | Sun ...................... H04N 23/741 |
| 2005/0195291 | A1 * | 9/2005 | Kubo .................... H04N 23/64 348/229.1 |
| 2021/0258465 | A1 * | 8/2021 | Saito .................... H04N 23/695 |
| 2024/0048672 | A1 * | 2/2024 | Jung .................... H04N 23/61 |

FOREIGN PATENT DOCUMENTS

| JP | 2010-193098 A | 9/2010 |
| JP | 2015-166767 A | 9/2015 |

* cited by examiner

*Primary Examiner* — Kelly L Jerabek

(74) *Attorney, Agent, or Firm* — Cowan, Liebowitz & Latman, P.C.

(57) ABSTRACT

An imaging apparatus according to the present invention includes at least one memory and at least one processor which function as: a first exposure control unit configured to perform first exposure control to suppress overexposure of a captured image; an image processing unit configured to perform image processing to suppress drop in brightness of a low brightness region of the image on a basis of a control amount of the first exposure control; and a second exposure control unit configured to perform second exposure control to bring a brightness of a high brightness region of a captured image closer to a target brightness which is set by a user, wherein in a case where the second exposure control is performed, the first exposure control unit does not perform the first exposure control.

3 Claims, 7 Drawing Sheets

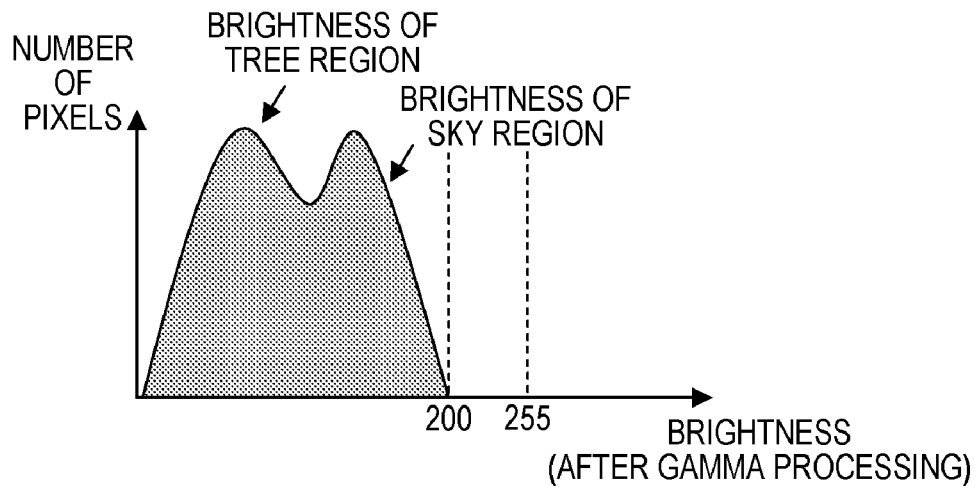
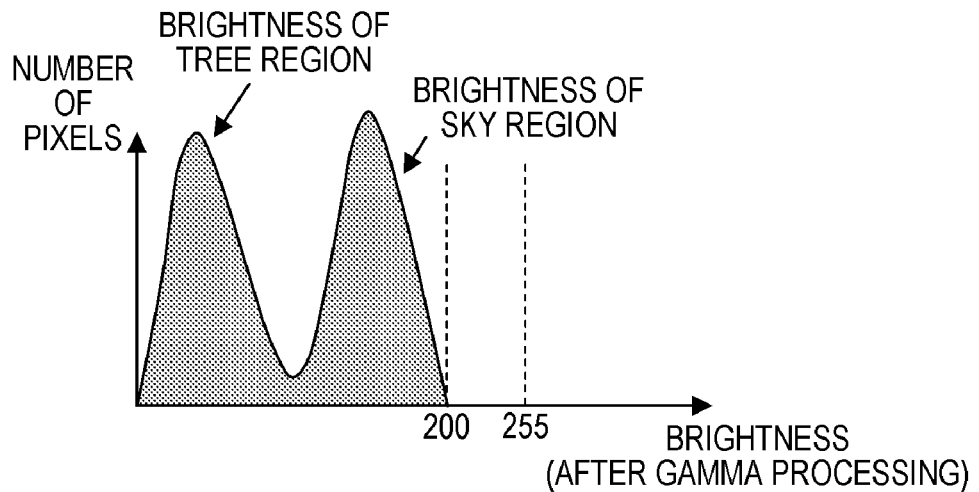

FIG. 7

| TARGET BRIGHTNESS | CORRECTION COEFFICIENT |
|---|---|
| 200 | 0.7 |
| 220 | 0.8 |
| 240 | 0.9 |

IMAGING APPARATUS CONFIGURED TO PERFORM TWO EXPOSURE CONTROLS

BACKGROUND OF THE INVENTION

Field of the Invention

The present invention provides an imaging apparatus.

Description of the Related Art

Japanese Patent Application Publication No. 2010-193098 discloses a technique to reduce exposure to suppress overexposure of a captured image, and use gamma processing to compensate for the drop in brightness of a low brightness region caused by reducing exposure. Japanese Patent Application Publication No. 2015-166767 discloses a technique to perform highlight-weighted photometry for performing photometry on a high brightness region of an image, and bring the brightness of the high brightness region closer to a target brightness that is set by a user. By combining these two techniques, the brightness of the high brightness region can be closer to the target brightness, while suppressing a drop in the brightness of the low brightness region.

However, in some cases image quality may drop by simply combining the above mentioned two techniques. For example, by combining the gamma processing (image processing) to compensate for (suppress) the drop in the brightness of the low brightness region and reducing the exposure (exposure control) to bring the brightness of the high brightness region closer to the target brightness, the brightness of the low brightness region and the brightness of the high brightness region may become close to each other. As a result, an image having low contrast (a foggy image with poor visibility) may be acquired.

SUMMARY OF THE INVENTION

The present invention provides a technique that can suppress a drop in image quality caused by performing image processing to suppress a drop in brightness of a low brightness region, in a case of performing an exposure control to bring the brightness of a high brightness region closer to the target brightness.

The present invention in its first aspect provides an imaging apparatus including at least one memory and at least one processor which function as: a first exposure control unit configured to perform first exposure control to suppress overexposure of a captured image; an image processing unit configured to perform image processing to suppress drop in brightness of a low brightness region of the image on a basis of a control amount of the first exposure control; and a second exposure control unit configured to perform second exposure control to bring a brightness of a high brightness region of a captured image closer to a target brightness which is set by a user, wherein in a case where the second exposure control is performed, the first exposure control unit does not perform the first exposure control.

The present invention in its second aspect provides an imaging apparatus including at least one memory and at least one processor which function as: a first exposure control unit configured to perform first exposure control to suppress overexposure of a captured image; an image processing unit configured to perform image processing to suppress drop in brightness of a low brightness region of the image on a basis of a control amount of the first exposure control; and a second exposure control unit configured to perform second exposure control to bring a brightness of a high brightness region of a captured image closer to a target brightness which is set by a user, wherein in a case where the second exposure control is performed, the second exposure control unit performs the second exposure control after the first exposure control, and the first exposure control unit determines the control amount of the first exposure control, by reducing the control amount in a case of not performing the second exposure control in accordance with the target brightness.

The present invention in its third aspect provides an imaging apparatus including at least one memory and at least one processor which function as: a first setting unit configured to set whether or not a first exposure control to suppress overexposure of a captured image is performed; a second setting unit configured to set whether or not a second exposure control, to bring a brightness of a high brightness region of a captured image closer to a target brightness which is set by a user, is performed; and a recording unit configured to record a captured image in a recording medium, wherein a first brightness, which is a brightness of a low brightness region of a captured image recorded without performing the first exposure control and the second exposure control, is substantially the same as a second brightness, which is a brightness of a low brightness region of a captured image recorded after performing the first exposure control without performing the second exposure control, and a third brightness, which is a brightness of a low brightness region of a captured image recorded after performing the first exposure control and the second exposure control, is lower than the first brightness and the second brightness.

The present invention in its fourth aspect provides a control method of an imaging apparatus, including: performing first exposure control to suppress overexposure of a captured image; and performing image processing to suppress drop in brightness of a low brightness region of the image on a basis of a control amount of the first exposure control, wherein second exposure control, to bring a brightness of a high brightness region of a captured image closer to a target brightness which is set by a user, is performable, and in a case where the second exposure control is performed, the first exposure control is not performed.

The present invention in its fifth aspect provides a non-transitory computer readable medium that stores a program, wherein the program causes a computer to execute a control method of an imaging apparatus, the control method including: performing first exposure control to suppress overexposure of a captured image; and performing image processing to suppress drop in brightness of a low brightness region of the image on a basis of a control amount of the first exposure control, wherein second exposure control, to bring a brightness of a high brightness region of a captured image closer to a target brightness which is set by a user, is performable, and in a case where the second exposure control is performed, the first exposure control is not performed.

Further features of the present invention will become apparent from the following description of exemplary embodiments with reference to the attached drawings.

BRIEF DESCRIPTION OF THE DRAWINGS

FIGS. 5A to 5D are schematic diagrams depicting brightness histograms of an image according to the present embodiment;

FIG. 7 is a table indicating correspondence between target brightness and a correction coefficient according to the present embodiment.

DESCRIPTION OF THE EMBODIMENTS

An embodiment of the present invention will now be described with reference to the drawings.

Configuration of Digital Camera

Figure 1:
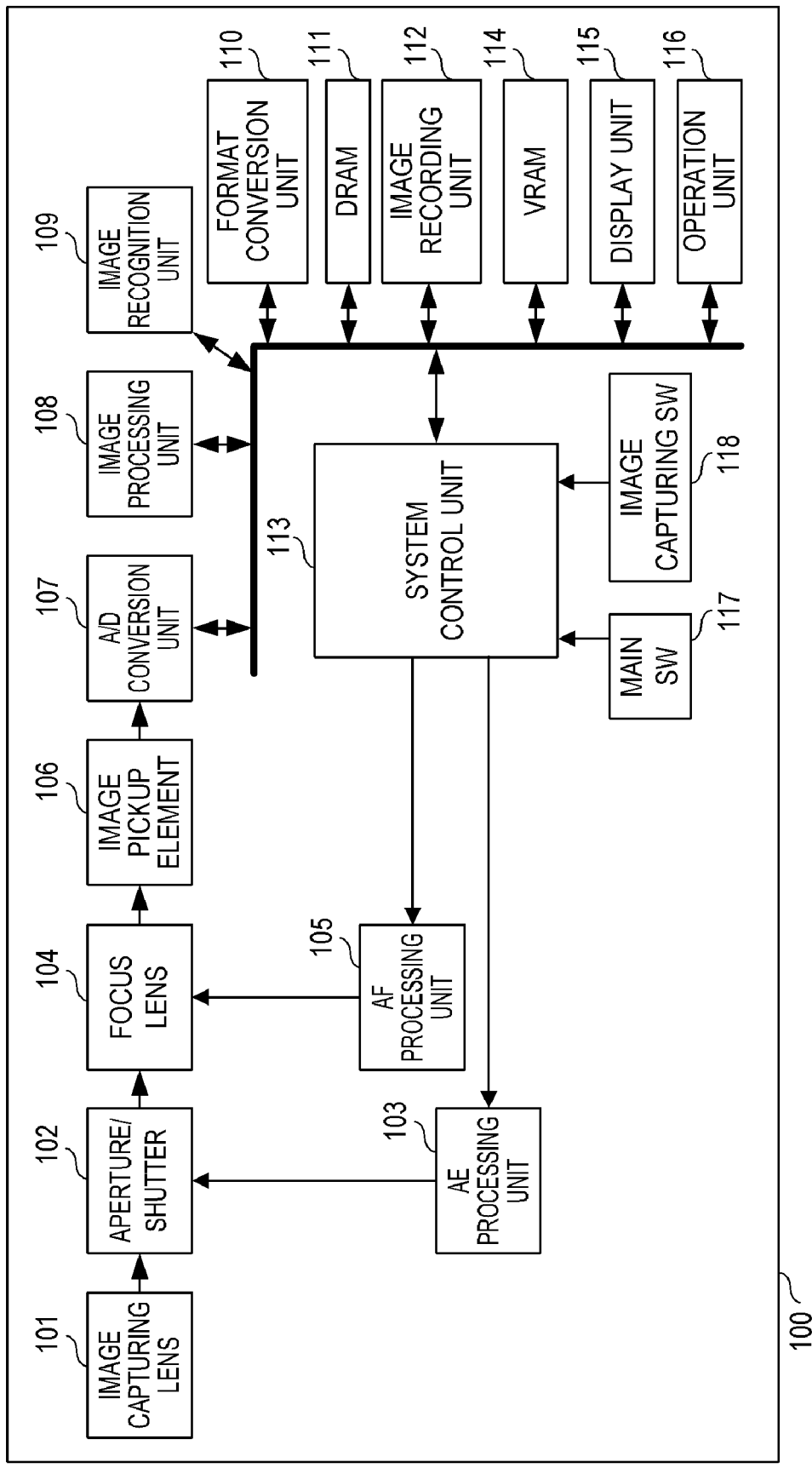
FIG. 1 is a block diagram depicting a configuration of a digital camera according to the present embodiment.

FIG. 1 is a block diagram depicting a configuration of a digital camera 100, which is an example of an imaging apparatus according to the present embodiment. As an imaging mechanism, the digital camera 100 includes an image capturing lens 101, an aperture/shutter 102, an auto-exposure (AE) processing unit 103, a focus lens 104, an auto-focus (AF) processing unit 105, an image pickup element 106, and an A/D conversion unit 107.

The image capturing lens 101 includes a zoom mechanism. The aperture/shutter 102 controls, in accordance with the instruction by the AE processing unit 103, a quantity of incident light, which is reflected light from an object entering the image pickup element 106, and a charge storage time. The AE processing unit 103 controls exposure by controlling the operation of the aperture/shutter 102. The AE processing unit 103 also controls the A/D conversion unit 107. The focus lens 104 focuses on a light-receiving surface of the image pickup element 106, and forms an optical image thereon, in accordance with control signals from the AF processing unit 105. The AF processing unit 105 calculates distance information from the digital camera 100 to the object.

The image pickup element 106 converts an optical image formed on the light-receiving surface into electric signals, using such a photoelectric conversion element as a CCD element or a CMOS element, and outputs the electric signals to the A/D conversion unit 107. The A/D conversion unit 107 converts the received electric signals (analog signals) into digital signals (RAW signals). The A/D conversion unit 107 includes a CDS circuit, which removes noise from the received electric signals, and a non-linear amplification circuit for non-linearly amplifying the received electric signals before converting the electric signals into digital signals.

The digital camera 100 also includes an image processing unit 108, an image recognition unit 109, a format conversion unit 110, and a dynamic RAM (DRAM) 111.

The image processing unit 108 performs development processing. In the development processing, predetermined image processing (e.g., resize processing, such as pixel interpolation and image demagnification, and color conversion processing) is performed on the digital signals inputted from the A/D conversion unit 107, for example. The image processing unit 108 also adjusts image quality by adjusting white balance (WB) and performing gradation correction to adjust brightness (brightness level) of the image, on the digital signals inputted from the A/D conversion unit 107.

For example, the image processing unit 108 adjusts the brightness of an entire image at a uniform amplification rate, or converts brightness in accordance with the level of the original brightness. The image processing unit 108 can also perform gradation correction processing in accordance with a scene, based on the recognition result by the image recognition unit 109.

Image data processed by the image processing unit 108 can be inputted to the image recognition unit 109. The image recognition unit 109 can recognize the luminance of the inputted image by performing photometry (photometric processing). For example, the image recognition unit 109 sets a plurality of regions for an image, and performs photometry on each region. Thereby the image recognition unit 109 can acquire the photometric result of each region, and determine a high brightness region. The photometric result (including determination result of a high brightness region) is outputted to the AE processing unit 103.

The image recognition unit 109 can also recognize (identify) a scene using a known technique. The image recognition unit 109 can detect a face, an upper body, or an entire body of a person, a dog, a cat, a bird, or the like from an image, or can detect a vehicle, such as a car and a motorcycle, in an image, and based on the detected object, the image recognition unit 109 can recognize a scene. For example, in a case where a face of a person is detected, the image recognition unit 109 can recognize that the scene is a scene capturing an image of a person. Further, in a case where a plurality of cars running side by side are detected, the image recognition unit 109 can recognize that the scene is a scene of motor sports. The information on the scene recognized by the image recognition unit 109 is outputted to the AE processing unit 103.

The user can select a photometry mode by operating an operation unit 116. The operation unit 116 notifies the photometry mode selected by the user to the AE processing unit 103. The AE processing unit 103 performs auto-exposure (AE) processing based on the photometric result acquired by the image recognition unit 109, information on the scene recognized by the image recognition unit 109, and the photometry mode selected by the user.

The image recognition unit 109 can also recognize the focusing state of an inputted image. The AF processing unit 105 performs auto-focus (AF) processing based on the recognition result of the focusing state. The image recognition unit 109 can also generate a brightness histogram of an inputted image. Based on the generated brightness histogram, the image processing unit 108 performs gradation correction processing corresponding to the scene.

The format conversion unit 110 converts the format of image data generated by the image processing unit 108, in order to store the image data in the DRAM 111. The DRAM 111 is an internal memory, and is used, for example, as a buffer to temporarily store image data, or as a work memory for compression/decompression processing of image data.

The digital camera 100 also includes an image recording unit 112, a system control unit 113, a video RAM (VRAM) 114, a display unit 115, the operation unit 116, a main switch (main SW) 117, and an image capturing switch (image capturing SW) 118.

The image recording unit 112 includes a recording medium (e.g., memory card) to store captured images (still images or moving images), and an interface thereof.

The system control unit 113 includes a CPU (processor), a ROM and a RAM. The CPU controls operation of the digital camera 100 in general by developing the programs stored in the ROM in the work area of the RAM, and executing the programs. For example, the system control unit 113 switches modes of the image pickup element 106 among a plurality of predetermined imaging drive modes. The VRAM 114 is a memory for displaying images.

Figure 2:
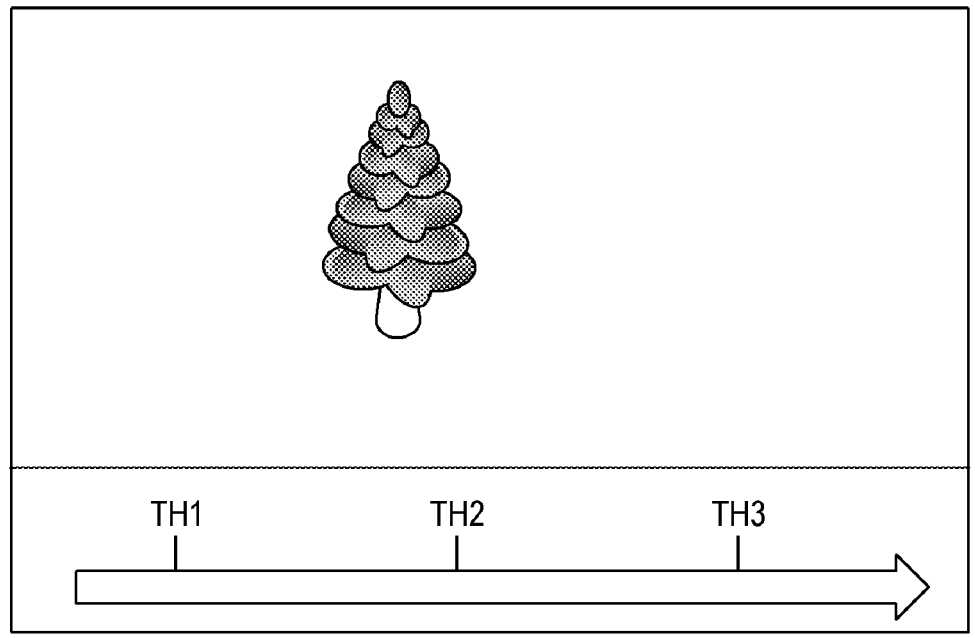
FIG. 2 is a diagram depicting a selection screen according to the present embodiment.

The display unit 115 is a liquid crystal display (LCD), for example. The display unit 115 can display an image, operation assistance, and state of the digital camera 100. When an image is captured, the display unit 115 displays an image capturing screen, and displays a distance measurement region on the image capturing screen. The display unit 115 can also display a selection screen for the user to select (specify) a target brightness of a high brightness region. FIG. 2 is an example of the selection screen. A method for the user to select the target brightness using the selection screen will be described later.

The operation unit 116 is a member for the user to operate the digital camera 100. By operating the operation unit 116, the user can perform various settings, such as exposure correction, aperture value and image reproduction, for example. The operation unit 116 includes a menu switch, a zoom lever to instruct zoom operation of the image capturing lens, and an operation mode selection switch to switch an operation mode between the image capturing mode and the reproduction mode.

As mentioned above, the user can select a photometry mode by operating the operation unit 116. The photometry modes that the user can select include, for example, an evaluation photometry mode, a partial photometry mode, and a highlight-weighted photometry mode.

The evaluation photometry mode is a mode in which photometry is performed for each of a plurality of regions that are set on the captured image, and a final exposure is determined based on the information on brightness distribution, color, distance and composition of the object. The evaluation photometry mode is appropriate for general image capturing, including backlight image capturing. The partial photometry mode is a mode in which photometry is performed for a center portion of an image. The partial photometry mode is effective when a strong light exists around an object (e.g., backlit scene). The highlight-weighted photometry mode is a mode in which photometry is performed for a high brightness region of an image. Generally if exposure control is performed based on the photometric result in the highlight-weighted photometry mode, so that the brightness region has an optimum luminance, an image darker than the case of performing exposure control, based on the photometric result in the evaluation photometry mode, is captured.

By operating the operation unit 116, the user can select a target brightness of a high brightness region. The target brightness selected by the user is outputted to the AE processing unit 103, and is used for controlling exposure. The target brightness is also outputted to the image processing unit 108, and is used for controlling the image processing.

The main switch 117 is a switch to turn the power of the digital camera 100 ON. The image capturing switch 118 is a switch that can perform two-step operations in accordance with the depressing depth. If the image capturing switch 118 is depressed half way (SW1 operation, image capturing preparation instruction), the system control unit 113 performs the image capturing preparation operation, including the AE processing and AF processing. If the image capturing switch 118 is fully depressed (SW2 operation, image capturing instruction), the system control unit 113 performs the image capturing processing.

A series of processing performed by the digital camera 100 will be described. When the power of the digital camera 100 is turned ON by depressing the main switch 117, the digital camera 100 enters the image capturing standby state (a state where the image pickup element 106 performs image processing at a predetermined cycle (e.g. 33 ms cycle), and captured images are sequentially displayed on the display unit 115). When the image capturing switch 118 is depressed (SW2 operation), the image pickup element 106 executes the main imaging processing, and the image (image data) acquired by this main imaging processing is image-processed by the image processing unit 108, and is then recorded in the image recording unit 112. Then the digital camera 100 returns to the image capturing standby state again. When the main switch 117 is depressed again, power of the digital camera 100 is shut OFF.

D+ Correction

The digital camera 100 can execute: exposure control to suppress (reduce) overexposure of a captured image; and image processing (gradation correction) to suppress a drop in the brightness of a low brightness region of the image, based on the control amount of exposure. In the following, the combination of the exposure control and image processing is referred to as "D+ correction". For the D+ correction, a known technique, such as a technique disclosed in Japanese Patent Application Publication No. 2010-193098 can be used. By performing the D+ correction, overexposure (saturation) of an object at high brightness can be suppressed, while maintaining the luminance of the object at low brightness in a scene where an object at low brightness and an object a high brightness coexist. The low brightness region is not especially limited, but is a region constituted of at least one pixel of which brightness is a threshold or less, for example. The threshold is a brightness at the center of a possible brightness range (dynamic range), or a brightness lower than this brightness.

Normally before capturing an image, image capturing conditions, such as an aperture value, shutter speed and gain, are set (determined) in accordance with the brightness information on the object and the presence/absence of a human face, so that the image can be captured at an appropriate exposure. However, in a scene where a dynamic range of an image to be captured is not wide (e.g., a backlit scene where an object is captured against the sun), the brightness of the bright background is saturated, and overexposure is generated regardless how the image capturing conditions are set.

In the D+ correction, the system control unit 113 sets (changes) the exposure value to an underexposure value using the AE processing unit 103, so as to prevent overexposure. Furthermore, using the image processing unit 108, the system control unit 113 performs image processing to increase the brightness of a low brightness region of the captured image. This image processing is gamma processing using a gamma curve, for example. Generally the image processing is performed such that the drop in brightness of the low brightness region, caused by reducing the exposure, is compensated for, and the brightness of the low brightness region becomes similar to the brightness at optimum exposure. Thereby the overexposure in the background can be suppressed (reduced) while maintaining the luminance of the object at low brightness.

The system control unit 113 determines the exposure change amount (control amount of exposure control, D+ correction amount) in the D+ correction in accordance with the luminance of the scene, for example. An example will be described below.

Figure 3:
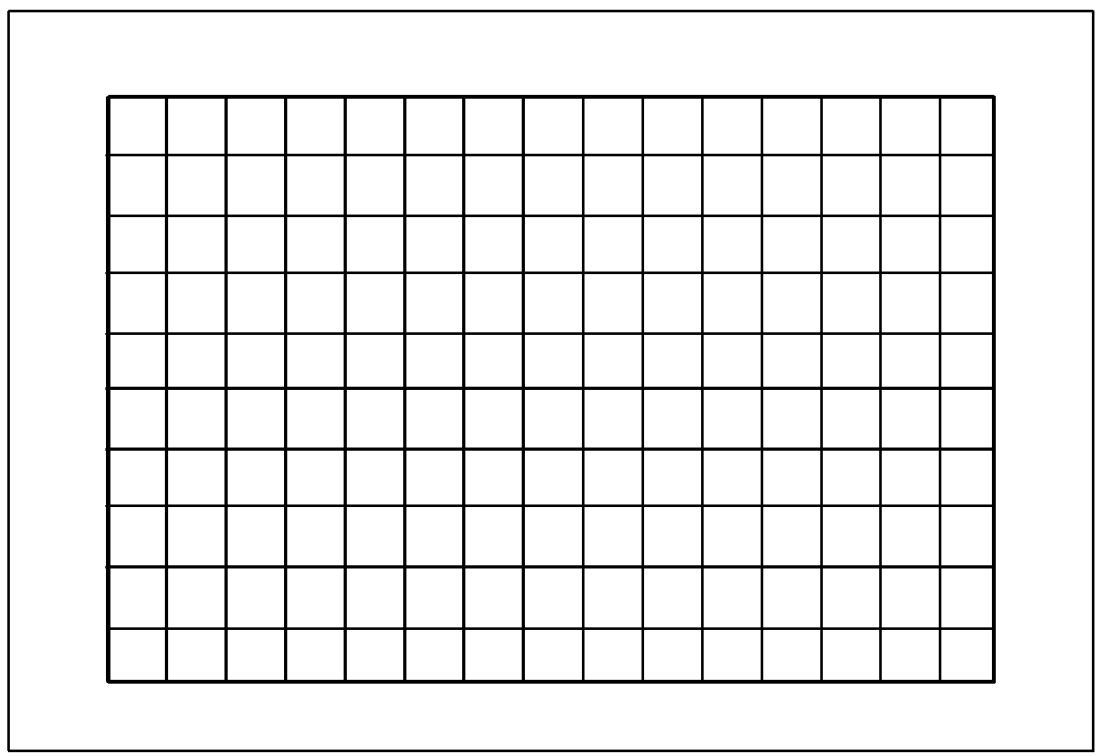
FIG. 3 is a diagram depicting a plurality of blocks of an image according to the present embodiment.

First, the system control unit 113 sets a plurality of regions (a plurality of blocks) for an image (through image) acquired by cyclic imaging processing in the image capturing standby state, and acquires a representative brightness for each block. Here it is assumed that the through image is acquired in a state where the exposure control (normal exposure control), to bring the average brightness of the entire image closer to a predetermined brightness, is performed. FIG. 3 indicates an example of the plurality of blocks. In FIG. 3, the plurality of blocks are set in a part of the image, but a region of the entire image may be divided into a plurality of blocks. The representative brightness of each block is an average brightness, a maximum brightness, a minimum brightness, a median brightness, or a mode brightness of this block, for example. In the present embodiment, the representative brightness is assumed to be the average brightness.

Then the system control unit 113 counts a number of blocks (saturated blocks) of which average brightness reached 255, which is a saturation value (upper limit value). The system control unit 113 reduces exposure in accordance with a number of saturated blocks. For example, the system control unit 113 reduces the exposure at a larger reducing amount as the number of saturated blocks is higher. Here the system control unit 113 changes the setting of the gamma curve in accordance with the reducing amount of the exposure, so that the brightness of the low brightness region of the through image does not change.

Then the system control unit 113 counts a number of saturated blocks in the captured through image again.

The system control unit 113 repeats the counting of the saturated blocks and the reducing of the exposure until the number of saturated blocks become 0. When the number of saturated blocks become 0, the system control unit 113 determines the total reducing amount of the exposure as the D+ correction amount (later mentioned tentative D+ correction amount) of the current scene.

Highlight-Weighted Exposure Control

The digital camera 100 can also execute the highlight-weighted exposure control. The highlight-weighted exposure control is exposure control to bring the brightness of the high brightness region of a captured image closer to a target brightness that is set by the user, and is executed in the highlight-weighted photometry mode. For the highlight-weighted exposure control, a known technique, such as a technique disclosed in Japanese Patent Application Publication No. 2015-166767, can be used. An example will be described below.

For example, the system control unit 113 displays a selection screen (user interface) in FIG. 2 on the display unit 115, and prompts the user to select a target brightness of the high brightness region, out of choices TH1, TH2 and TH3. By selecting (specifying) the target brightness, the user can adjust the brightness of the high brightness region of the captured image to the brightness intended by the user. The number of choices may be more or less than 3.

When the image capturing switch 118 is depressed (SW2 operation), the system control unit 113 sets a plurality of blocks on the through image acquired at this point, and acquires the representative brightness for each block. As mentioned above, in the present embodiment, the representative brightness is the average brightness.

Then as the high brightness region (highlight portion), the system control unit 113 selects a block, of which average brightness is highest, out of the plurality of blocks.

Then by performing inverse gamma processing (inverse conversion of gamma processing), the system control unit 113 converts the target brightness and the brightness of the high brightness region into the signal values before the gamma processing, and calculates the exposure step difference between the acquire two signal values. For the exposure step difference, the difference of the additive system of photographic exposure (APEX) values are calculated. When a linear signal value of the target brightness before performing the gamma processing is a signal value Ya, and a linear signal value of the brightness of the high brightness region before performing the gamma processing is a signal value Yb, the exposure step difference between the signal value Ya and the signal value Yb can be calculated by Log (Ya/Yb).

Here it is assumed that 200 is selected as a JPEG brightness (a gradation value of a JPEG image), which is the target brightness. It is also assumed that the brightness of the high brightness region is 240. If the signal value Ya which corresponds to the target brightness 200 is 5000, and the signal value Yb which corresponds to the brightness 240 of the high brightness region is 10000, then Log (Ya/Yb)=−1. Therefore the system control unit 113 can bring the brightness of the high brightness region closer to the target brightness by increasing the current exposure value of the aperture/shutter 102 by one step. Thus the system control unit 113 can control the exposure in accordance with the exposure step difference between the signal value Ya and the signal value Yb (exposure step difference between the target brightness and the brightness of the highlight portion), such that the brightness of the high brightness region approximately (substantially) matches with the target brightness specified by the user.

Problem Generated by Combining D+ Correction and Highlight-Weighted Exposure Control By combining the D+ correction and the highlight-weighted exposure control, the brightness of the high brightness region can be brought closer to the target brightness specified by the user, while maintaining the brightness of the low brightness region at a brightness that is set in the normal exposure control. However, if the D+ correction and the highlight-weighted exposure control are simply combined, image quality may drop. An example will be described below with reference to FIGS. 4A and 4B and FIGS. 5A to 5C.

Figure 4A:
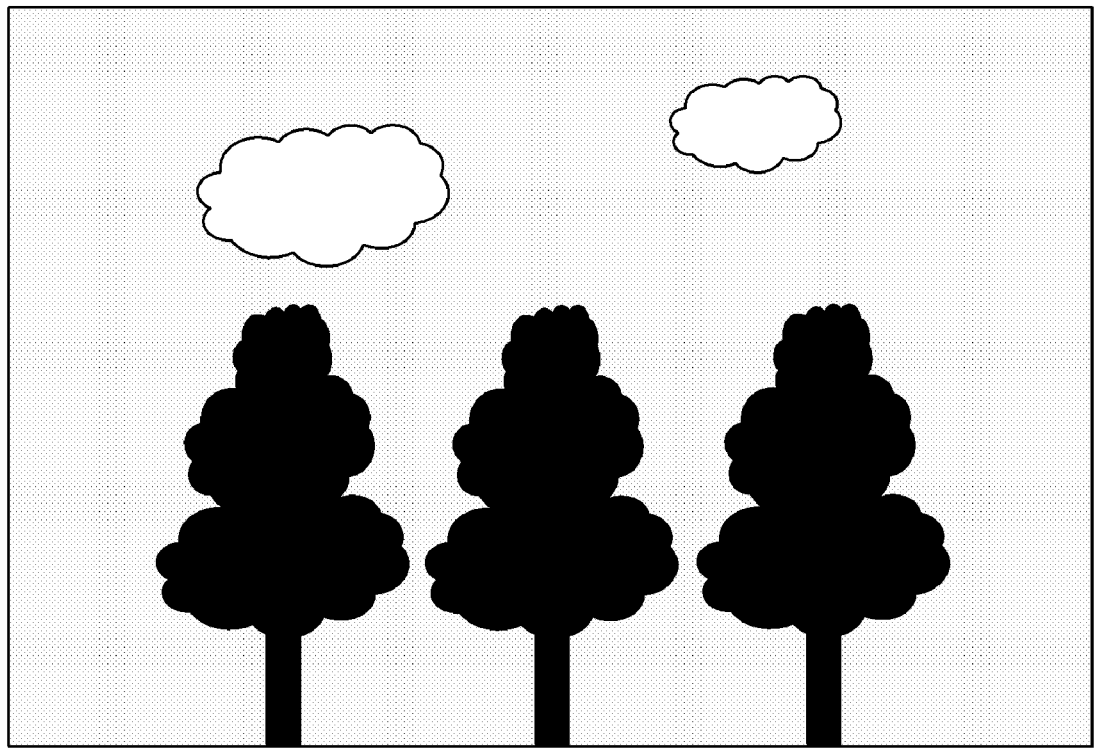
FIGS. 4A and 4B are diagrams depicting images according to the present embodiment.
Figure 5A:
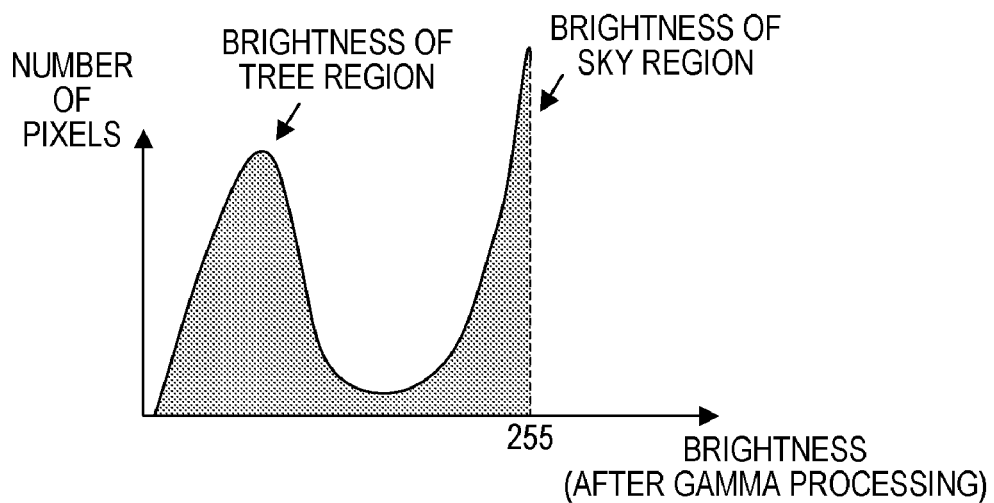

FIG. 4A indicates an example of an image captured in a state where the normal exposure control is being performed. The image in FIG. 4A is an image of a scene where sky and trees in a backlit state are included in an angle of view. FIG. 5A indicates a brightness histogram (brightness distribution) of the image in FIG. 4A. In FIG. 5A, the brightness of the region of the sky (region where brightness is relatively high) reached the saturated value 255 as a result of performing the normal exposure control based on the average brightness of the entire image.

Figure 5B:
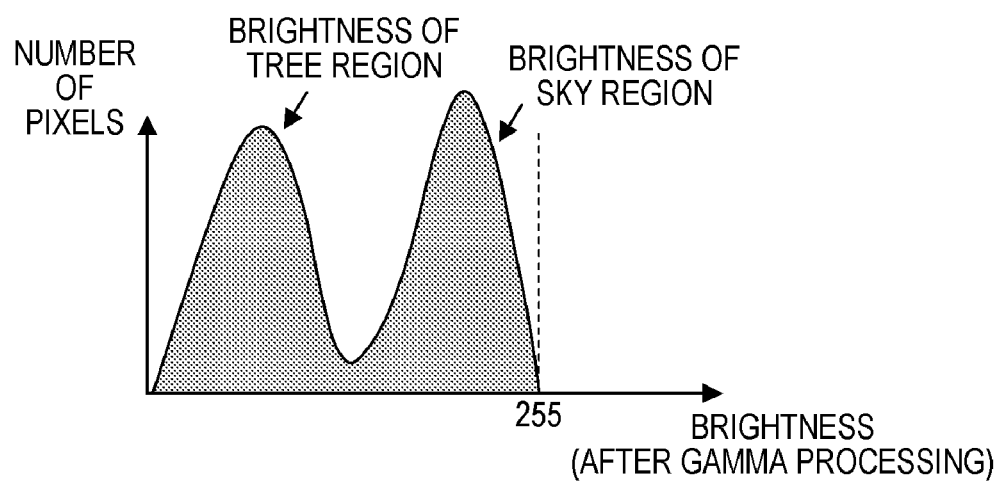

By performing the D+ correction, overexposure of the region of the sky can be reduced while maintaining the brightness of the region of the trees (low brightness region), as indicated in FIG. 5B.

If the highlight-weighted exposure control is executed in the state of FIG. 5B, the brightness (maximum brightness) of the high brightness region can be reduced to the target brightness 200 specified by the user, as indicated in FIG. 5C.

Figure 4B:
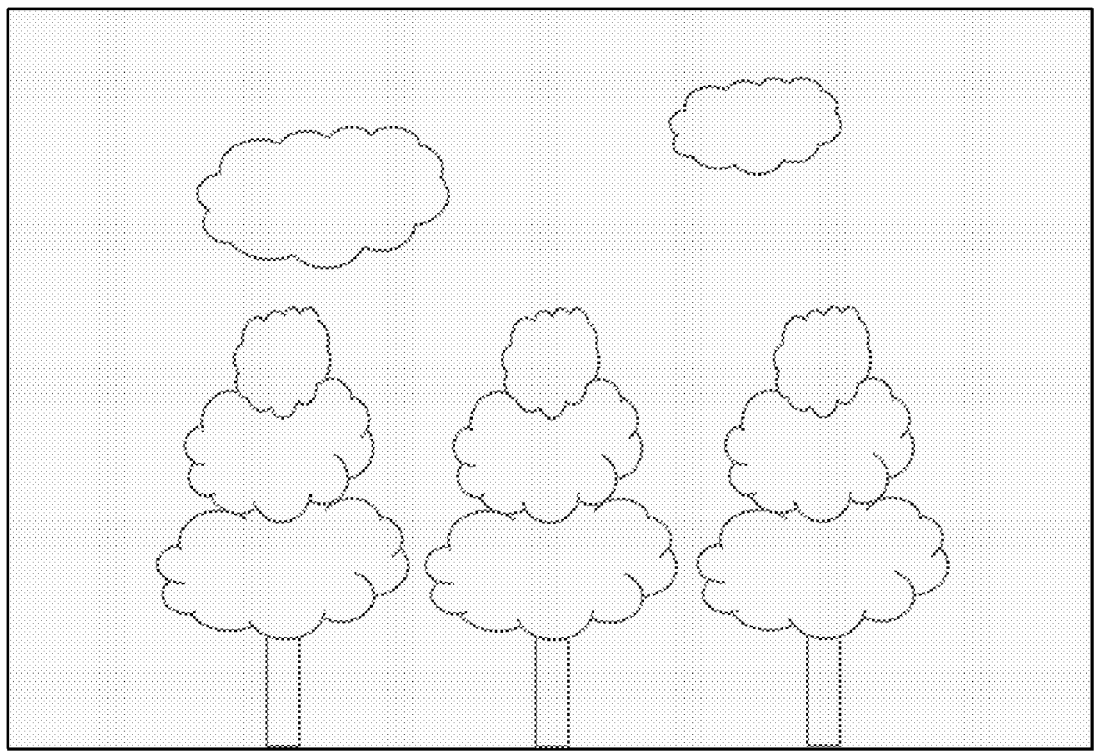

However, in FIG. 5C, the brightness of the region of the tress and the brightness of the region of the sky are similar. Therefore as indicated in FIG. 4B, an image with low contrast (a foggy image with poor visibility) is generated. As the D+ correction amount is larger, or as the target brightness is lower, the brightness of the low brightness region and the brightness of the high brightness region become closer, and a drop in contrast becomes more obvious.

Solution of Problem Generated by Combining

Figure 6:
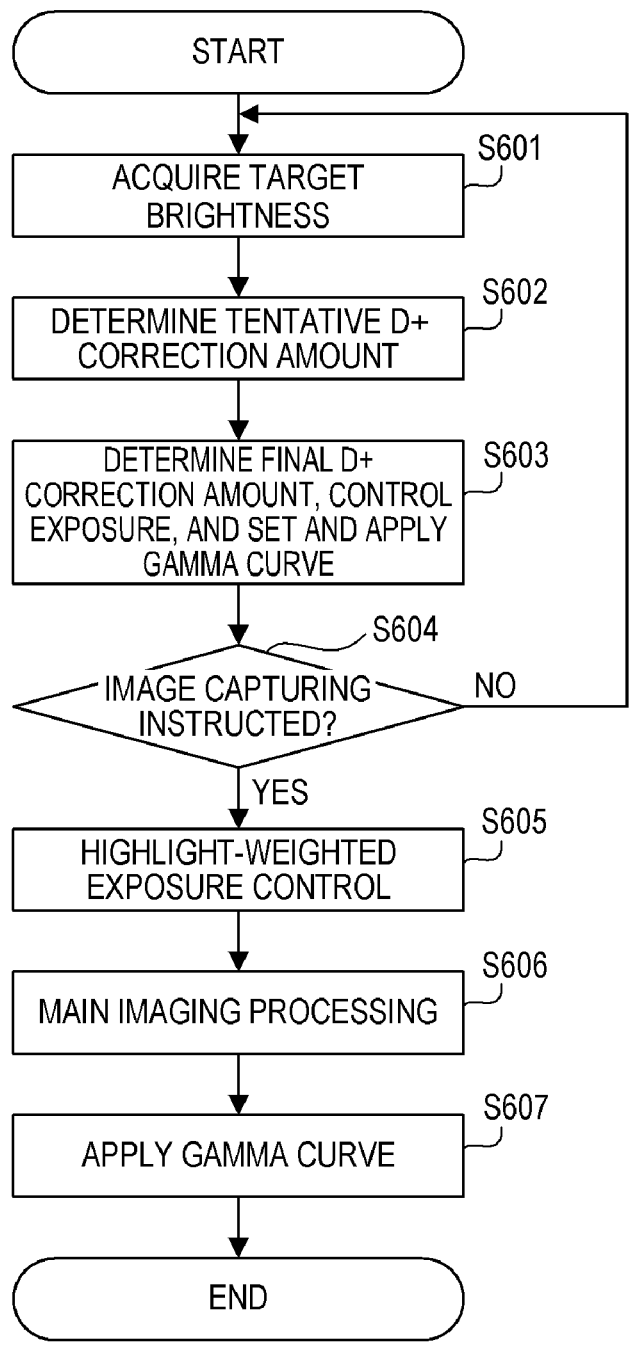
FIG. 6 is a flow chart depicting the processing according to the present embodiment.

FIG. 6 is a flow chart depicting an example of the processing performed by the digital camera 100. The processing in FIG. 6 includes the D+ correction and the highlight-weighted exposure control, but according to the processing in FIG. 6, the above mentioned problem generated by combining the D+ correction and the highlight-weighted exposure control can be solved. Details thereof will be described later. For example, when the power of the digital camera 100 is turned ON, and the digital camera 100 enters the image capturing standby state, the processing in FIG. 6 starts.

In step S601, the system control unit 113 prompts the user to specify the target brightness of the high brightness region using the above mentioned method, and thereby acquires the target brightness specified by the user.

In step S602, the system control unit 113 calculates the D+ correction amount from the through image using the above mentioned method, and determines the calculated D+ correction amount as a tentative D+ correction amount.

In step S603, the system control unit 113 reduces the tentative D+ correction amount in accordance with the target brightness acquired in step S601, and thereby determines the final D+ correction amount. For example, the system control unit 113 reduces the tentative D+ correction amount using a correction coefficient, which is corresponded to the target brightness acquired in step S601 in advance. For the correction coefficient, a value that is larger than 0 and smaller than 1 is used. As mentioned above, as the D+ correction amount is larger, a drop in contrast becomes more obvious, hence a smaller correction coefficient is used as the target brightness is lower. The correction coefficient to be used is determined using, for example, a table or a function to indicate a correspondence between the target brightness and the correction coefficient. In the ROM of the system control unit 113, a table indicated in FIG. 7 (3 correction coefficients corresponding to 3 choices of the target brightness (3 brightness that can be set as the target brightness) respectively) may be stored in advance. As mentioned above, the number of choices may be more or less than 3.

The method for reducing the tentative D+ correction amount is not limited to the above method. For example, the system control unit 113 may reduce the tentative D+ correction amount using a function of which input value is the target brightness and output value is the final D+ correction amount. The system control unit 113 may omit the D+ correction in a case where the target brightness is lower than the predetermined threshold. Further, the system control unit 113 may omit the D+ correction in a case of executing the highlight-weighted exposure control, regardless of whether the target brightness is lower than a predetermined threshold or not.

In a case where the highlight-weighted exposure control is not performed, the processing to reduce the tentative D+ correction amount is not executed. Therefore in the case where the highlight-weighted exposure control is not performed, the tentative D+ correction amount is regarded as the final D+ correction amount.

In step S603, the system control unit 113 controls the exposure and sets the gamma curve in accordance with the final D+ correction amount. The system control unit 113 applies the gamma curve that is set here to the through image (through image acquired in the state where exposure is controlled in accordance with the final D+ correction amount).

In step S604, the system control unit 113 determines whether image capturing instruction was performed (fully depressed operation on the image capturing switch 118, SW2 operation). The system control unit 113 returns the processing to step S601 if it is determined that the image capturing instruction was not performed, or advances processing to step S605 if it is determined that the image capturing instruction was performed.

In step S605, the system control unit 113 performs the highlight-weighted exposure control using the above mentioned method. Here the highlight-weighted exposure control is performed on the through image in which the D+ correction has been performed. Therefore in the inverse gamma processing, a gamma curve, of which setting has been changed in accordance with the final D+ correction amount, is used. Since the D+ correction amount is reduced in step S603, the brightness of the high brightness region of the through image becomes higher, and an amount of exposure decreased by the highlight-weighted exposure control increases, compared with the case of not reducing the D+ correction amount.

In step S606, the system control unit 113 acquires an image by performing the main imaging processing at the exposure determined in step S605 (in the state where the D+ correction and the highlight-weighted exposure control have been performed).

In step S607, the system control unit 113 applies the gamma curve, which was set in step S603 (gamma curve in accordance with the final D+ correction amount), to the image acquired in step S606.

As described above, according to the present embodiment, the final D+ correction amount is determined by reducing the tentative D+ correction amount in accordance with the target brightness (or the D+ correction is omitted if the highlight-weighted exposure control is performed). Thereby a drop in image quality caused by performing gamma processing, included in the D+ correction, when the highlight-weighted control is performed, can be suppressed. For example, in the case of the scene of FIG. 4A and FIG. 5A, the brightness of the region of the trees (low brightness region) decreases by reducing the D+ correction amount, whereby the brightness histogram in FIG. 5D is acquired. In the brightness histogram in FIG. 5D, the brightness of the region of the trees and the brightness of the region of the sky are separated, indicating that an image with high contrast has been acquired.

Hence it is assumed that the system control unit 113 can set whether or not the D+ correction is performed, and whether or not the highlight-weighted exposure control is performed. For example, the system control unit 113 performs these settings in accordance with instructions from the user. In this case, according to the present embodiment, the following relationships are established. The first brightness is a brightness of a low brightness region of a captured image, which was recorded without performing the D+ correction and the highlight-weighted exposure control (in the case of performing the normal exposure control). The second brightness is a brightness of a low brightness region of a captured image, which was recorded after performing the D+ correction without performing the highlight-weighted exposure control. The third brightness is a brightness of a low brightness region of a captured image recorded after performing the D+ correction and the highlight-weighted exposure control.

The first brightness and the second brightness are approximately (substantially) the same.

The third brightness is lower than the first brightness and the second brightness.

The above embodiments (including modifications) are merely examples, and a configuration acquired by appropriately modifying or changing the configurations of the above embodiments within a scope of the spirit of the present invention are also included in the present invention. Configurations acquired by appropriately combining the configurations of the above embodiments are also included in the present invention.

According to the present invention, a drop in image quality caused by performing image processing to suppress a drop in brightness of a low brightness region can be suppressed in a case of performing an exposure control to bring the brightness of a high brightness region closer to the target brightness.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-167664, filed on Oct. 19, 2022, which is hereby incorporated by reference herein in its entirety.

What is claimed is:

1. An imaging apparatus comprising at least one memory and at least one processor which function as:
a first setting unit configured to set whether or not a first exposure control to suppress overexposure of a captured image is performed;
a second setting unit configured to set whether or not a second exposure control, to bring a brightness of a high brightness region of a captured image closer to a target brightness which is set by a user, is performed; and
a recording unit configured to record a captured image in a recording medium, wherein
a first brightness, which is a brightness of a low brightness region of a captured image recorded without performing the first exposure control and the second exposure control, is substantially the same as a second brightness, which is a brightness of a low brightness region of a captured image recorded after performing the first exposure control without performing the second exposure control, and
a third brightness, which is a brightness of a low brightness region of a captured image recorded after performing the first exposure control and the second exposure control, is lower than the first brightness and the second brightness.

2. A control method of an imaging apparatus, comprising:
setting whether or not a first exposure control to suppress overexposure of a captured image is performed;
setting whether or not a second exposure control, to bring a brightness of a high brightness region of a captured image closer to a target brightness which is set by a user, is performed; and
recording a captured image in a recording medium, wherein
a first brightness, which is a brightness of a low brightness region of a captured image recorded without performing the first exposure control and the second exposure control, is substantially the same as a second brightness, which is a brightness of a low brightness region of a captured image recorded after performing the first exposure control without performing the second exposure control, and
a third brightness, which is a brightness of a low brightness region of a captured image recorded after performing the first exposure control and the second exposure control, is lower than the first brightness and the second brightness.

3. A non-transitory computer readable medium that stores a program, wherein the program causes a computer to execute a control method of an imaging apparatus, the control method comprising:
setting whether or not a first exposure control to suppress overexposure of a captured image is performed;
setting whether or not a second exposure control, to bring a brightness of a high brightness region of a captured image closer to a target brightness which is set by a user, is performed; and
recording a captured image in a recording medium, wherein
a first brightness, which is a brightness of a low brightness region of a captured image recorded without performing the first exposure control and the second exposure control, is substantially the same as a second brightness, which is a brightness of a low brightness region of a captured image recorded after performing the first exposure control without performing the second exposure control, and
a third brightness, which is a brightness of a low brightness region of a captured image recorded after performing the first exposure control and the second exposure control, is lower than the first brightness and the second brightness.

* * * * *